Jan. 12, 1932.   A. W. RYBECK   1,841,255
FLEXIBLE SHAFT COUPLING
Filed June 30, 1928.   2 Sheets-Sheet 1
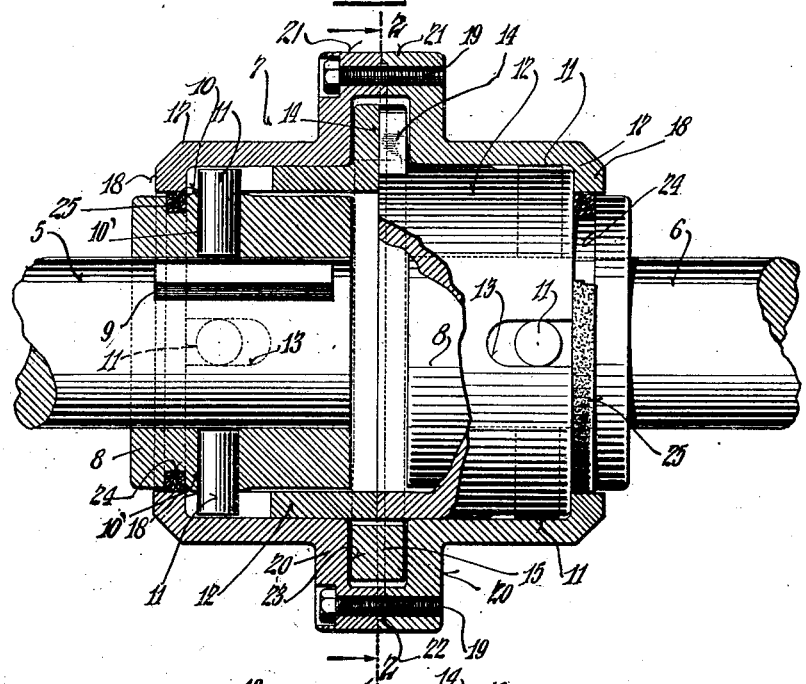
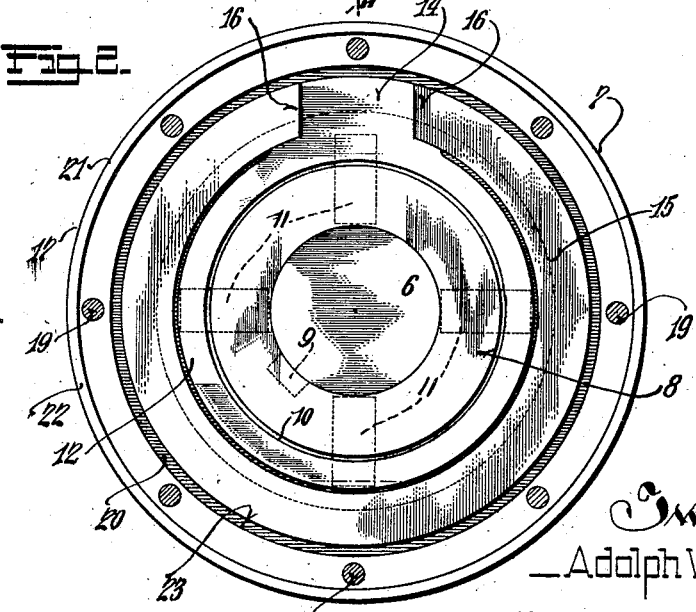
Inventor
Adolph W. Rybeck
By Ira Milton Jones
Attorney

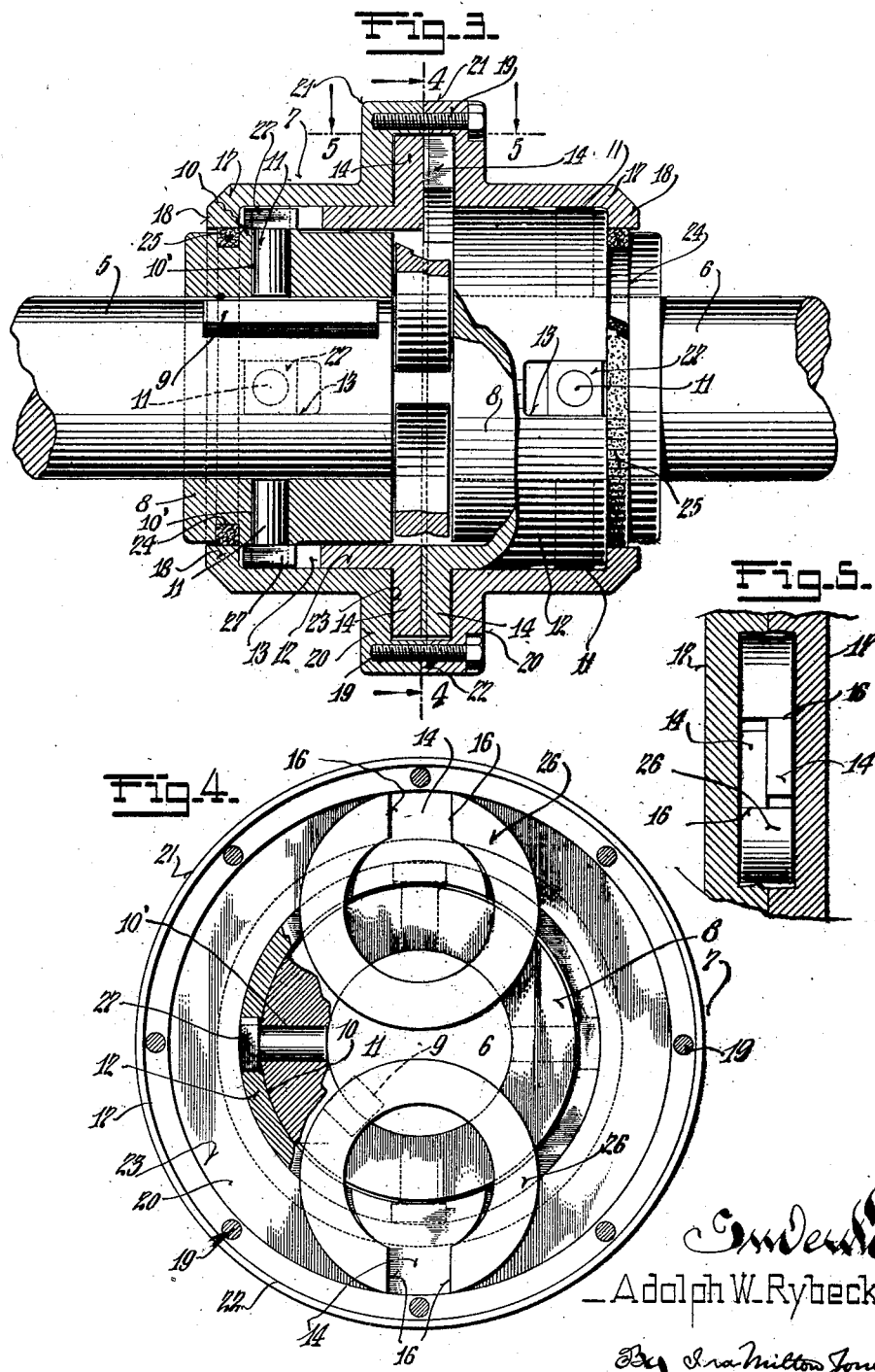

Patented Jan. 12, 1932

1,841,255

UNITED STATES PATENT OFFICE

ADOLPH W. RYBECK, OF MILWAUKEE, WISCONSIN

FLEXIBLE SHAFT COUPLING

Application filed June 30, 1928. Serial No. 289,381.

This invention relates particularly to couplings for shafts arranged end to end whereby they are flexibly connected to accommodate any disalignment therebetween.

Heretofore, various types of flexible couplings have been devised to drivingly connect two shafts but none have been able to accommodate all of the different forms of disalignment which might exist without materially injuring the adjacent bearings and in most instances the shock absorbing feature was very inadequate.

Therefore, it is an object of this invention to provide a coupling for flexibly connecting two shafts which has adequate shock absorbing means and which accommodates any offset, end play or angular misalignment which may exist between the shafts without placing any strain on the adjacent bearings.

Another object of this invention resides in the provision of a coupling of improved design which is substantially full floating, permitting longitudinal movement of the coupling means on the shaft.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated two complete examples of the physical embodiment of my invention constructed according to the best modes I have so far devised for the practical application of the principles thereof, and in which:

Figure 1 is a transverse, sectional view of a coupling embodying my invention, parts thereof being in elevation;

Figure 2 is a cross sectional view, taken through Figure 1 on the plane of the line 2—2;

Figure 3 is a view similar to Figure 1 of a slightly modified form of my invention;

Figure 4 is a cross sectional view, taken through Figure 3 on the plane of the line 4—4; and Figure 5 is a fragmentary, detail, sectional view, taken through Figure 3 on the plane of the line 5—5.

Referring now more particularly to the accompanying drawings, in which like numerals designate like parts throughout the several views, 5 and 6 designate shafts either of which may be the driven or the drive shaft, the adjacent ends of which are resiliently connected by my improved coupling, designated generally as at 7.

The coupling consists of a pair of similar hub members 8 splined to the adjacent ends of the shafts 5 and 6, as at 9, and having annular arcuate shaped enlargements or bearing collars 10 formed on their outer periphery through which a plurality of equally spaced radial apertures 10' extend to mount driving pins 11. A pair of complementary sleeve members 12 are engaged over the hub members with their inner ends abutting and with their bores engaging the hub members only at the enlargements or bearing collars 10. The outer ends of the sleeve members are slotted, as at 13, at points corresponding to the position of the pins 11 to slidably engage their projected ends. Thus the sleeve members 12 are drivingly connected with the shafts 5 and 6 through the hub members 8 but are freely slidable with respect thereto, and are free to assume positions of axial disalignment as they engage the hub members only at the bearing collars or enlargements 10.

Formed on the meeting ends of the sleeve members are lugs or projections 14 of equal width and normally in radial alignment being held in this position by a split resilient ring 15, the ends of which engage the opposite faces 16 of the lugs, the width of the ring being substantially equal to the combined thickness of the lugs 14. Any tendency on the part of the shafts to rotate in opposite directions is yieldably resisted by the split ring 15 which is spread by the torque between the shafts as the lugs or projections tend to move out of alignment, thereby providing adequate shock absorbing means, as will be readily apparent.

The sleeve members 12 are maintained with their meeting ends abutting by housings 17 having flanges 18 which engage the opposite ends of the sleeve members and are connected at their meeting faces by screws or the like 19. The housings have annular flanges 20 extended therefrom provided with a laterally directed rib 21 the outer faces of which engage and have an interlocking connection 22, the screws 19 passing through the portions 21. As the annular flanges 20 of the housings are spaced from each other, they provide a recess 23 of a width slightly greater than that of the split ring 15.

The hub members 8 are provided with annular grooves 24 adjacent their outer ends to receive packing rings 25 which engage the inner peripheries of the flanges 18 to provide a substantially oil proof seal.

As has been described, the sleeve members are free to assume positions of axial disalignment which accommodates offset and angular disalignment between the shafts, and the substantially floating mounting of the resilient ring provides adequate shock absorbing means. End play is accommodated by the slidable connection between the hubs and the sleeve members and as the sleeve members and the housings are connected and form substantially a single unit the coupling as a whole is substantially full floating, being longitudinally movable with respect to the shafts a limited distance.

In Figures 3 and 5, inclusive, a slightly modified form of my invention is illustrated in which two resilient rings 26 are provided. In this embodiment, the hubs 8 retain their same design but the driving pins 11 are provided with removable wear absorbing collars 27 which are substantially square to provide a larger surface area. The sleeve members, in this instance, are provided with second lugs 14 arranged diametrically opposite as illustrated in Figure 4 and likewise in normal radial alignment. The rings 26 each engage a set of lugs 14 in the same manner as described in connection with the embodiment illustrated in Figure 1, and as clearly shown in Figure 4, are of a diameter substantially half the diameter of the sleeve members having their closed ends positioned towards the axes of the shafts and between the adjacent ends of the shafts and the hub members.

Figure 5 illustrates the position of the rings and the lugs 14 when the resilient rings are under load.

From the foregoing description, taken in connection with the accompanying drawings, it will be readily apparent to those skilled in the art to which an invention of this character appertains, that I provide a shaft coupling for flexibly connecting the adjacent ends of shafts which accommodates offset, angular disalignment, and end play, provides adequate shock absorbing means and is substantially full floating to preclude the imparting of strain to the adjacent shaft bearings.

What I claim as my invention is:

1. A coupling between two shafts, comprising sleeve members, means slidably but non-rotatably mounting the sleeve members on the adjacent ends of the shafts, lugs carried by the sleeve members, and a split resilient ring having the lugs of both sleeves positioned between its ends.

2. A coupling between two shafts, comprising a split resilient ring, a pair of lugs normally in juxta position between the ends of the ring, means slidably but non-rotatably mounting the lugs one on each shaft, and means movable with the lugs independent of the shafts for maintaining the lugs and the split resilient ring in alignment.

3. A coupling between two shafts, comprising a split resilient ring, a pair of lugs normally in juxta position between the ends of the ring, mounting means for slidably but non-rotatably connecting one lug with each shaft, and a housing substantially enclosing the coupling and free to move rotatably and axially with respect to the shafts for maintaining the lugs and the ring in alignment.

4. A coupling between two shafts, comprising hub members fixed to the adjacent ends of the shafts, sleeve members, means slidably but non-rotatably connecting the sleeve members with the hub members, lugs carried by the sleeve members, and a split resilient ring between the ends of which the lugs are positioned.

5. A coupling between two shafts, comprising hub members fixed to the adjacent ends of the shafts, sleeve members, means slidably but non-rotatably connecting the sleeve members with the hub members, lugs carried by the sleeve members, a split resilient ring between the ends of which the lugs are positioned, and a housing enclosing the sleeve members and the ring.

6. A coupling between two shafts comprising hub members secured to each shaft, sleeve members slidably but non-rotatably carried by the hub members, the sleeve members abutting at their outer ends, projections on the sleeve members, a split resilient ring embracing the sleeve members with the projections between the ends of the ring, housing means enclosing the sleeve members, and means carried by the housing means for retaining the sleeve members against spreading.

7. A resilient coupling between two shafts comprising a lug non-rotatably connected with each shaft, a split ring between the ends of which the lugs are received, and a housing movable axially and rotatably with respect to the shafts for maintaining the split ring and the lugs in alignment at all times.

8. A coupling between two shafts, comprising sleeve members, means freely slidably but non-rotatably mounting the sleeve members on the ends of the shafts, lugs carried by the sleeve members, a split resilient ring having the lugs of both sleeves positioned between its ends to provide a yieldable drive connection between the shafts which permits longitudinal movement of the shafts with respect to each other, and means maintaining the lugs and the split ring in alignment at all times whereby longitudinal movement of the shafts does not affect the driving connection between the lugs and the ring.

9. A coupling between two shafts, comprising sleeve members, lugs carried by the sleeve members, a split ring having the lugs of both sleeve members positioned between its ends, means maintaining the sleeve members against separation and the ring in proper alignment with the lugs at all times, and means freely slidably but non-rotatably mounting one sleeve member on each shaft whereby the shafts are resiliently drivingly connected and limited longitudinal movement of the sleeve members and the resilient ring with respect to the shafts is permitted and relative longitudinal movement between the shafts accommodated.

10. A coupling between two shafts comprising sleeve members normally parallel with the shafts, means for non-rotatably mounting the sleeve members on the shafts, said means providing for angular disalignment between the shafts and the sleeve members, and flexible means for connecting the sleeve members.

11. A coupling between two shafts comprising, sleeve members normally parallel with the shafts, means for non-rotatably mounting the sleeve members on the shafts, said means providing for angular disalignment between the shafts and sleeve members, flexible means for connecting the sleeve members, and a housing enclosing the sleeve members and the flexible means connecting the same.

12. A coupling between two shafts comprising sleeve members movably but non-rotatably mounted one on each shaft, lugs carried by the sleeve members, a split resilient ring having the lugs of both sleeve members positioned between its ends, and a housing enclosing the sleeve members and the split resilient ring.

13. A coupling between two shafts comprising a hub carried by each shaft, sleeve members movably but drivingly mounted on the hubs, means for connecting the sleeve members, and a housing for maintaining the sleeve members and the means connecting the same in position.

14. A coupling between two shafts comprising a hub fixed to each shaft, sleeve members non-rotatably but slidably engaging the hubs, flexible means connecting the sleeve members, and a housing enclosing the sleeve members and flexible means.

15. A coupling between two shafts comprising a hub fixed to each shaft, sleeve members drivingly connected with the hubs, lugs carried by the sleeve members, a split resilient ring positioned in a plane between the hubs and having a lug on each sleeve member disposed between its ends, and a free floating housing enclosing the sleeve members and the split resilient ring.

16. A coupling between two shafts comprising sleeve members drivingly connected with the shafts, a split ring-shaped spring located in a plane between the ends of the shafts for yieldably connecting the sleeve members, and a housing for maintaining the sleeve members and spring in proper relative positions.

17. A coupling between two shafts comprising hubs fixed to the adjacent end portions of the shafts and having cylindrical surfaces, bearing collars projecting from the cylindrical surface of each hub, sleeve members having an internal diameter substantially equal to the diameter of the bearing collars and positioned one over each hub, means drivingly connecting each sleeve member with its respective hub, the bearing collars serving to space the internal surface of the sleeve members from the major portion of the hubs to facilitate axial movement between the sleeve members and the hubs, and means yieldably connecting the sleeve members to provide a yielding shock-proof drive between the shafts.

18. A coupling between two shafts comprising a member fixed to each of said shafts, a sleeve connected with one of said members to transmit rotational movement between said sleeve and said member and to permit limited axial movement between said member and sleeve, a second sleeve connected with said other member to transmit rotational movement between said second sleeve and said second member, said sleeves being provided with corresponding lugs, and a split ring carried by said sleeves and having the ends thereof contacting the lugs of both sleeves to form a resilient driving connection between said shafts.

19. A coupling between two shafts comprising a hub fixed to each of said shafts, a sleeve connected with one of said hubs to transmit rotary motion between said hub and said sleeve and to permit limited axial and pivotal movement between said hub and said sleeve, a second sleeve connected with said second hub to transmit rotary motion between said second hub and said second sleeve, said sleeves being provided with corresponding lugs, and a split ring carried by said sleeves and having the ends thereof contacting both of said lugs to form a resilient driving connection between said shafts.

20. A coupling between two shafts comprising a hub fixed to each of said shafts, a first sleeve connected with one of said hubs to transmit rotary motion between said first sleeve and said hub and to permit limited axial movement therebetween, a second sleeve connected with the other said hub to transmit rotary motion between said second sleeve and said other hub, said sleeves being provided with corresponding lugs, means carried by said sleeves to prevent axial separation of said corresponding lugs, and a split ring carried by said sleeves and having the ends thereof contacting said lugs to form a resilient driving connection between said shafts.

21. A coupling between two shafts comprising a hub fixed to each of said shafts, a sleeve connected with one of said hubs to transmit rotary motion between said sleeve and said hub and to permit limited axial and pivotal movement therebetween, a second sleeve connected with said other hub to transmit rotary motion between said second sleeve and said other hub, said sleeves being provided with corresponding lugs, a housing carried on said sleeves preventing axial separation of said lugs, and a split ring carried by said sleeves and having the ends thereof contacting both of said lugs to form a resilient driving connection between said shafts.

22. A coupling between two shafts comprising a hub fixed to each of said shafts, a sleeve connected with one of said hubs to transmit rotary motion between said sleeve and said hub and to permit limited axial movement therebetween, a second sleeve connected with said other hub to transmit rotary motion between said second sleeve and said other hub and to permit limited pivotal movement therebetween, said sleeves being provided with corresponding lugs, and a split ring carried by said sleeves and having the ends thereof contacting said corresponding lugs to form a resilient driving connection between said shafts.

23. A coupling between two shafts comprising a hub fixed to each of said shafts, a sleeve connected with one of said hubs to transmit rotary motion between said hub and said sleeve and to permit limited axial movement therebetween, a second sleeve connected with said other hub to transmit rotary motion between said second sleeve and said other hub and to permit limited pivotal movement therebetween, said sleeves being provided with corresponding lugs, a split ring carried by said sleeves and having the ends thereof contacting said lugs to form a resilient driving connection between said shafts, and a housing carried by said sleeves preventing axial separation of said lugs.

24. A coupling between two shafts comprising a hub fixed to each of said shafts, a sleeve connected with one of said hubs to transmit rotary motion between said hub and said sleeve and to permit limited axial movement therebetween, a second sleeve connected with said other hub to transmit rotary motion between said second sleeve and said other hub, each of said sleeves being provided with a plurality of corresponding lugs, a plurality of split rings engaging a pair of corresponding lugs on opposite sides thereof to form a resilient driving connection between said shafts.

25. A coupling between two shafts comprising a hub fixed to each of said shafts, a sleeve connected with one of said hubs to transmit rotary motion between said sleeve and said hub, and to permit limited axial and pivotal movement therebetween, a second sleeve member connected with said other hub to transmit rotary motion between said second sleeve and said other hub, said sleeves having corresponding faces, a plurality of lugs spaced about the periphery of each of said faces and in corresponding circumferential relationship, a plurality of split rings carried by said sleeves each ring having the ends thereof engaging a pair of corresponding lugs on both sides thereof to form a resilient driving connection between said sleeves.

26. A coupling between two shafts comprising a hub fixed to said shafts, a sleeve connected with one of said hubs to transmit rotary motion between said hub and said sleeve and to permit limited axial movement therebetween, a second sleeve connected with said other hub to transmit rotary motion between said other hub and said second sleeve, said sleeves having corresponding faces, a plurality of lugs spaced about the periphery of each of said mating faces in corresponding circumferential relationship, a plurality of split rings carried by said sleeves each ring having the ends thereof engaging a pair of corresponding lugs on both sides thereof to form a resilient driving connection between said sleeves.

27. A coupling between two shafts comprising a hub fixed to each of said shafts, a sleeve connected with one of said hubs to transmit rotary motion between said hub and said sleeve and to permit limited axial and pivotal movement therebetween, a second sleeve connected with said other hub to transmit rotary motion between said second sleeve and said other hub, said sleeves having corresponding faces, a plurality of lugs spaced about the periphery of each of said faces in corresponding circumferential relationship, a plurality of split rings carried by said sleeves each ring having the ends thereof engaging a pair of corresponding lugs on both sides thereof to form a resilient driving connection between said sleeves.

28. A coupling between two shafts comprising a hub fixed to each of said shafts, a sleeve connected with one of said hubs to transmit rotary motion between said sleeve and said hub and to permit limited axial and pivotal movement therebetween, a second sleeve connected with said other hub to transmit rotary motion between said second sleeve and said other hub and to permit limited pivotal movement therebetween, said sleeves having corresponding faces, a plurality of lugs spaced about the periphery of each of said faces in corresponding circumferential relationship, a plurality of split rings carried by said sleeves each ring having the ends thereof engaging a pair of corresponding lugs on both sides thereof to form a resilient driving connection between said sleeves.

29. A coupling between two shafts comprising a hub fixed to each of said shafts, a sleeve connected with one of said hubs to transmit rotary motion between said sleeve and said hub and to permit limited axial and pivotal movement therebetween, a second sleeve connected with said other hub to transmit rotary motion between said second sleeve and said other hub and to permit limited pivotal movement therebetween, said sleeves having corresponding faces, a plurality of lugs spaced about the periphery of each of said faces in corresponding circumferential relationship, a plurality of split rings carried by said sleeves each ring having the ends thereof engaging a pair of corresponding lugs on both sides thereof to form a resilient driving connection between said sleeves, a housing carried on said sleeves preventing axial separation of said lugs.

In testimony whereof I have hereunto affixed my signature.

ADOLPH WM. RYBECK.